United States Patent [19]
Boron

[11] 3,913,404
[45] Oct. 21, 1975

[54] SAMPLING DEVICE
[75] Inventor: Joseph J. Boron, Medina, Ohio
[73] Assignee: Rossborough Manufacturing Co., Cleveland, Ohio
[22] Filed: Oct. 3, 1974
[21] Appl. No.: 511,592

[52] U.S. Cl............. 73/425.4 R; 73/DIG. 9; 251/11
[51] Int. Cl.² ........................................... G01N 1/12
[58] Field of Search ............... 73/425.4 R, DIG. 9; 251/11; 137/76; 164/4

[56] References Cited
UNITED STATES PATENTS

| | | | |
|---|---|---|---|
| 2,869,370 | 1/1959 | Pagonis | 73/DIG. 9 UX |
| 3,656,350 | 4/1972 | Collins | 73/425.4 R |
| 3,751,986 | 8/1973 | Boron | 73/425.4 R |

Primary Examiner—Richard C. Queisser
Assistant Examiner—Joseph W. Roskos
Attorney, Agent, or Firm—Fay & Sharpe

[57] ABSTRACT

A device especially suited for taking samples from a molten metal bath. The sampling device includes a housing, a mold chamber contained in the housing, an inlet tube member for conveying molten metal to the mold chamber, and a valve means for closing the inlet tube when it reaches a predetermined temperature.

8 Claims, 4 Drawing Figures 3,913,404

SAMPLING DEVICE

BACKGROUND OF THE INVENTION

The subject invention is directed toward the art of measuring and testing and, more particularly, to a device for taking a sample of a molten metal.

The invention is especially suited for taking samples from a molten metal bath and will be described with particular reference thereto; however, as will become apparent, the invention is capable of broader application and could be used in other types of metal samplers and for samplers used for other materials.

Many different types of sampling devices have been proposed in the prior art for the purpose of taking a sample from a bath of molten metal. One class of these sampling devices is generally referred to as "immersion" samplers. Samplers of this general type are shown, for example, in U.S. Pat. Nos. 3,452,602; 3,415,124 and 3,646,816. Typically, an immersion sampler includes a tube or housing in which is mounted a mold chamber. The interior of the mold chamber is communicated with the exterior of the housing by a refractory tube. Generally, the outer end of the tube is shielded by a consumable cap of metal.

To use the device for sample taking, it is mounted on a lance and plunged into the molten metal. The metal shield cap prevents slag on the top of the molten metal from entering the mold chamber. However, the shield quickly burns away and the metal flows into the chamber. Thereafter, the device is withdrawn. Subsequently, the metal solidifies and cools sufficiently to permit the device to be destroyed and the solid sample to be extracted for testing.

In order to prevent the sample while in the molten state from flowing back out of the device during withdrawal, the prior art used two different approaches. The first involved making the mold chamber and associated structure with sufficient mass such that the sample was quickly chilled. This arrangement increased the size and weight of the devices, as well as, requiring rather close control of the immersion time (i.e., the period during which they were permitted to remain in the metal). The second approach involved the use of a labyrinthine inlet path to the mold chamber. This slowed flow from the chamber sufficiently to permit some solidification of the molten metal to take place. The drawbacks with the second approach were general complexity and, also, close control of immersion time.

BRIEF DESCRIPTION OF THE INVENTION

The subject invention overcomes the above problems and provides a molten metal sampling device in which the metal is retained in the mold chamber without the use of a heavy massive mold body or the use of labrum fine inlet paths. Devices formed in accordance with the subject invention can be simple, inexpensive and lightweight. Specifically, in accordance with the subject invention, a sampling device of the type including a mold chamber and wall means defining an inlet path to the mold chamber is provided with valve means for closing the inlet path when the walls of the path reach a predetermined temperature. In accordance with the preferred embodiment, the inlet path is defined by a tube formed from a material which becomes soft at elevated temperatures. The valve means comprises a spring arrangement adapted to squeeze the tube shut after it has softened due to the effect of the high temperature molten metal flowing therethrough. By proper selection of the material and wall thickness for the tube, and the spring pressure in relationship to the temperature of the molten metal, it is possible to cause the inlet to be closed at approximately the time the mold chamber has filled. Thus, the prior art problems with outflow during withdrawal are eliminated.

According to somewhat more specific aspects of the invention, the valve means comprises a generally C-shaped strip of spring steel which surrounds the inlet tube and is under a continuous bias acting to squeeze the inlet tube. It should be obvious from the following specification, however, that a variety of various valve arrangements could be used if desired. Additionally, as will become apparent, the subject invention could be used for immersion samplers of the general type described above as well as the commonly-used stream samplers which extract metal from a flowing stream.

Accordingly, a primary object of the invention is the provision of a molten metal sampling device which includes valve means for closing the inlet passage after the sample has been taken to prevent outflow of the sampled metal.

A somewhat more specific object of the invention is the provision of a sampling device of the type described wherein the valving action is provided by a spring member adapted to squeeze the inlet passage closed in response to its reaching a predetermined temperature.

BRIEF DESCRIPTION OF THE DRAWINGS

The above and other objects and advantages will become apparent from the following desription when read in conjunction with the accompanying drawings wherein.

DETAILED DESCRIPTION OF THE DRAWINGS

Figure 1:
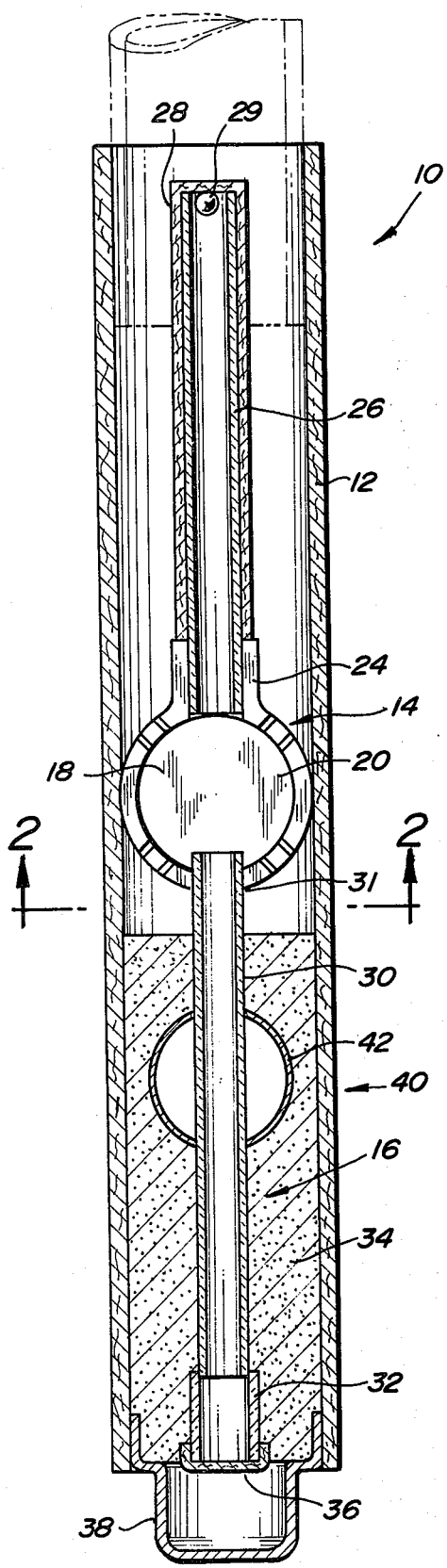
FIG. 1 is a longitudinal cross-sectional view through a preferred embodiment of a sampling device formed in accordance with the subject invention.
Figure 2:
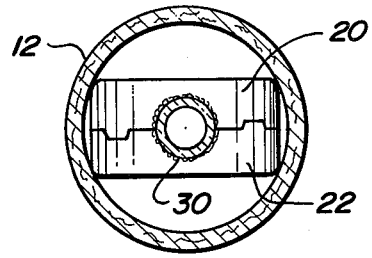
FIG. 2 is a cross-sectional view taken on line 2—2 of FIG. 1.

Referring more particularly to the drawings wherein the showings are for the purpose of illustrating a preferred embodiment of the invention only and not for the purpose of limiting same, FIG. 1 best shows the overall arrangement of a sampling device 10 specifically intended for use in taking a sample of molten metal by being submerged into a bath of the metal. In particular, device 10 comprises an outer housing or casing 12 which, in the preferred embodiment, is a heavy, cylindrical paperboard tube or sleeve. Mounted within the housing 12 is a mold chamber defining assembly 14 which is communicated to the lower end of the housing 12 by an inlet passageway defining means 16. The mold chamber assembly 14 could have many different configurations. In the subject embodiment, however, a somewhat disc-shaped mold chamber 18 is defined by a pair of mating, powdered metal mold halves 20 and 22. The upper end of the mold halves (as viewed in FIG. 1) includes an extension portion 24 which receives a tube member 26. The tube member 26 is formed from Pyrex or a similar material which becomes soft at elevated temperatures and is in open communication with the mold chamber 18. The purpose of the tube 26 is to provide a long, thin pin sample of the metal to facilitate testing procedures.

In the embodiment shown, a cardboard tube 28 is received about the tube 26 and serves as an insulating sleeve for the pin sample tube 26. A small metal ball or bead 29 is bonded or otherwise held in the upper end of the cardboard tube 28 and performs the function of chilling the molten metal when it enters this end of the pin tube 26 to prevent it from burning through the cardboard tube and flowing out. Further, tube 28 is provided with small openings or passageways in its upper end so that any air which is trapped in the mold chamber assembly 14 by the incoming flow of molten metal can escape to allow the molten metal to flow upwardly into the mold chamber 18 and the pin sample tube 26. Understandably, the upper end of tube 28 could also be made of a porous material instead of being provided with passageways therethrough.

The inlet passage assembly for the mold chamber 18 comprises a tube 30 formed of Pyrex or a similar material which becomes soft at elevated temperatures. The upper end of tube 30 extends into the mold chamber 18 and is bonded to the mold halves by a suitable refractory cement 31. At the lower end of tube 30, a somewhat larger diameter short section of quartz tube 32 is connected to extend substantially to the end of the housing 10. The tubes 30, 32 are bonded in position in the housing 12 by a core sand cylinder 34. The core sand cylinder 34, in addition to bonding the tubes 30, 32 and the mold chamber defining means 14 in the housing 10, also performs an insulating function to protect the tubes 30, 32 as the device is plunged into the bath of molten metal. Further, the core sand cylinder 34 functions to support the mold chamber defining means 14 within the housing 12. Positioned over the lower end of the tube 32 is a paperboard cover or disc 36. Additionally, a thin metal cap member 38 is attached to the end of the housing tube 12. The metal cap 38 and paperboard cap 36 prevent entry of slag into the tubes 32, 30 and mold chamber 18 as the device is plunged through the usual slag into the main body of molten metal. However, the thin metal cap 38 and the paperboard cap 36 are quickly burned away by the heat of the molten metal and the metal can then flow upwardly into the mold chamber 18 and the pin sample tube 26.

Figure 3:
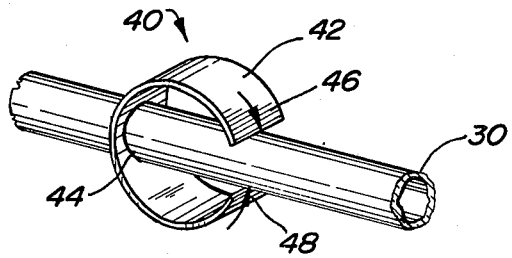
FIGs. 3 and 4 are pictorial views showing the preferred form of valving mechanism.

The apparatus thus far described is, in overall arrangement, somewhat similar to the prior art units discussed earlier. As mentioned, one of the problems with this general arrangement is that when used for immersion sampling, the device is plunged downwardly into a ladle or similar container of the molten metal. The mold chamber and other internal passageways fill with the molten metal as the device is submerged. However, when the device is withdrawn, there is a tendency for the molten metal to flow back out of the device unless the metal has at least partially chilled. As noted earlier, two different, relatively unsatisfactory, approaches have been used to prevent the outflow. Specifically, increased mass of the unit for chilling and/or labyrinthine flow passages. The subject invention overcomes the noted problems of undesired outflow with an extremely simple arrangement which closes off the inlet passage at the proper time. In particular, the subject device includes a valve means 40 which is arranged to close the inlet passage after the passage has reached a predetermined temperature. In the preferred embodiment, the valve means 40 comprises a circular spring member 42 positioned about the tube 30. As best shown in FIG. 3, the circular spring 42 has a first opening 44 through which tube 30 passes. The free ends 46 and 48 of the spring 42 are engaged on generally diagonally opposite sides of tube 30. The spring 42 is designed so that the ends 46 and 48 continually act toward one another to place the tube 30 under a compressive bias from opposite sides.

Figure 4:
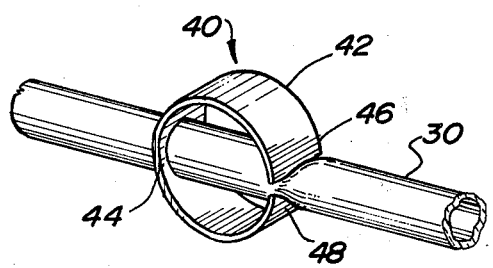

When the sample device 10 is plunged into a bath of molten metal, the protective caps 36 and 38 are burned away and the molten metal flows to the mold chamber 18 and the sample pin tube 26 through the inlet passage defined by tubes 32 and 30. While the molten metal flows through tube 30, the tube is heated and after a period of time softens due to the temperature of the molten metal. To prevent the molten metal both surrounding the sampling device 10 from further softening the tube 30, core sand cylinder 34 acts as an insulating means thereby inhibiting the flow of heat to the tube except for the heat generated by the molten metal flowing through the tube 30. Understandably, core sand cylinder 34 also functions to insulate spring 42 from the heat of the molten metal bath. As tube 30 softens, the compressive forces applied by the ends of spring 42 squeeze the tube as illustrated in FIG. 4. This, of course, continues until the tube is squeezed substantially shut. As can be seen, this closes off the inlet passage and, consequently, during withdrawal of the sampling device from the bath no molten metal can flow back out of the mold chamber.

As can be appreciated, the exact period at which the valve mechanism will act to close the passage will depend upon the material from which the tube 30 is made, the temperature and specific heat of the molten metal as well as the compressive force applied by spring 42. Therefore, by proper selection of the material and wall thickness for the tube 30, and the spring pressure of spring 42 in relationship to the temperature of the molten metal, it is possible to cause the inlet to be closed at approximately the time the mold chamber 18 and pin sample tube 26 have filled. The proper relationship of these factors can be readily found by minor experimentation. However, when a device formed as shown in the preferred embodiment has tube 30 formed from Pyrex of a diameter of approximately 8 millimeters and a wall thickness of approximately one millimeter, a relatively light spring pressure will close the tube after approximately 7 seconds.

As is obvious, many different types of valving mechanisms responsive to the temperature of the passageway could be used for carrying out the subject invention. Additionally, a variety of spring or other biasing means could be used if desired.

The invention has been described in great detail sufficient to enable one of ordinary skill in the art to make and use the same. Obviously, modifications and alterations of the preferred embodiment will occur to others upon a reading and understanding of the specification and it is my intention to include all such modifications and alterations as part of my invention insofar as they come within the scope of the appended claims.

What is claimed is:

1. A molten metal sampling device comprising:
    first wall means defining a mold chamber;
    second wall means defining an inlet passage for conveying molten metal into said chamber; and, valve means associated with said second wall means for closing said inlet passage in response to said second wall means reaching a predetermined temperature.

2. The sampling device as defined in claim 1 wherein said second wall means includes at least a portion thereof which becomes soft at said predetermined temperature and wherein said valve means includes means for compressing said soft portion of said second wall means in a direction to close the passage defined thereby.

3. The sampling device as defined in claim 1 wherein said first wall means comprise a pair of mating mold sections and said second wall means comprises a tube member which extends into said chamber, said tube member being formed from a material which becomes soft at the predetermined temperature said valve means including a spring member continually acting against said tube and having sufficient force to squeeze said tube shut at said predetermined temperature.

4. A device for immersion into a bath of molten metal for taking a sample of said molten metal comprising:
 a housing;
 a mold chamber in said housing;
 a tube member providing an inlet path for the flow of molten metal from exteriorly of said housing to said chamber;
 a valve means in said housing for blocking flow through said tube when said tube reaches a predetermined temperature; and,
 insulation means surrounding said tube to inhibit flow of heat to said tube except from molten metal flowing through said tube.

5. A device as defined in claim 4 wherein said valve means comprises a spring member operative to close said tube when said tube reaches said predetermined temperature.

6. A device as defined in claim 4 wherein at least a portion of said tube is formed from a material which is soft at said predetermined temperature and wherein said valve means includes means for squeezing said tube shut when it becomes soft at said predetermined temperature.

7. A device as defined in claim 4 wherein said housing comprises a paper cylinder and wherein said insulation means supports said tube within said cylinder.

8. A sampling device adapted to be mounted on a lance for manual manipulation for insertion into a bath of molten metal to take a sample of said metal comprising:
 a housing;
 first wall means within said housing defining a mold chamber for receiving molten metal;
 second wall means within said housing defining a passageway from said mold chamber to the exterior of said housing to permit molten metal to flow into said chamber; and,
 valve means in said housing for closing said passageway when said second wall means reach a predetermined temperature.

* * * * *